Jan. 3, 1961  S. SQUILLER  2,966,813
ROTARY INDEXING TABLE
Filed Feb. 12, 1957  2 Sheets-Sheet 1
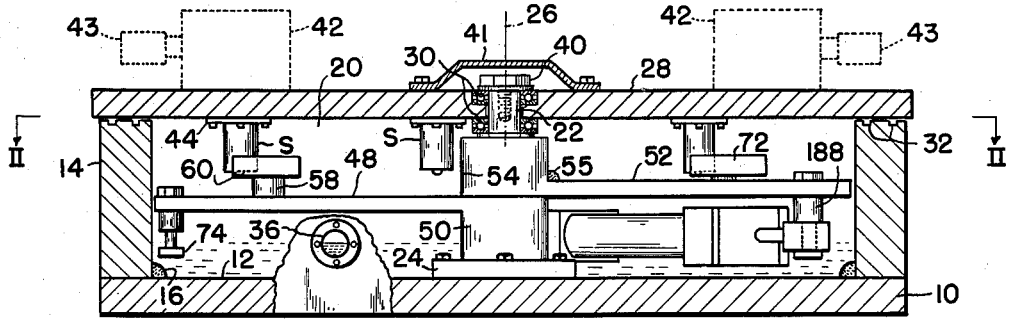
Fig. 1
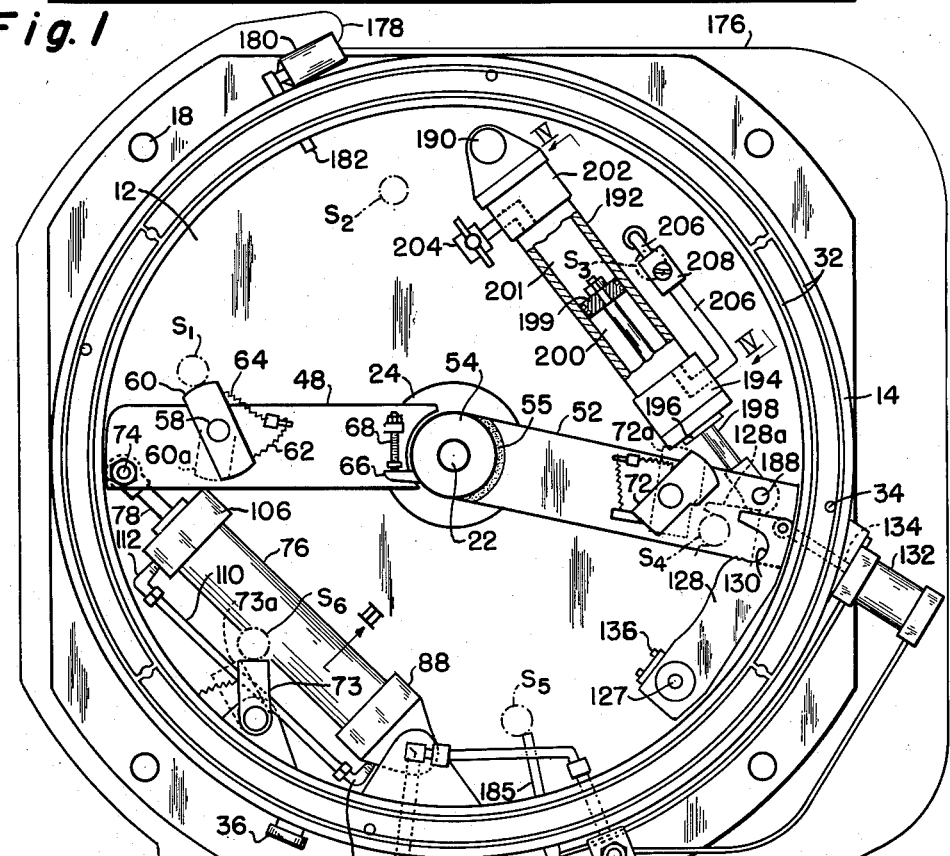
Fig. 2
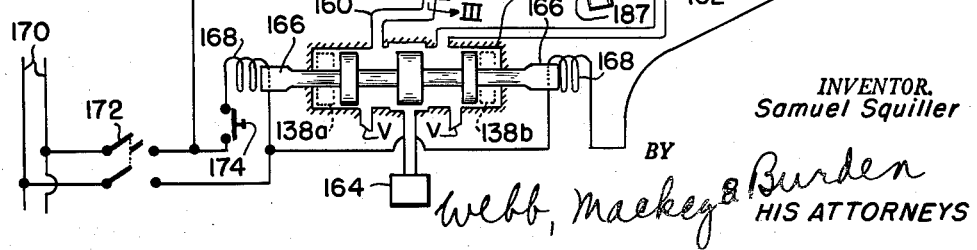
INVENTOR.
Samuel Squiller
BY
Webb, Mackey & Burden
HIS ATTORNEYS

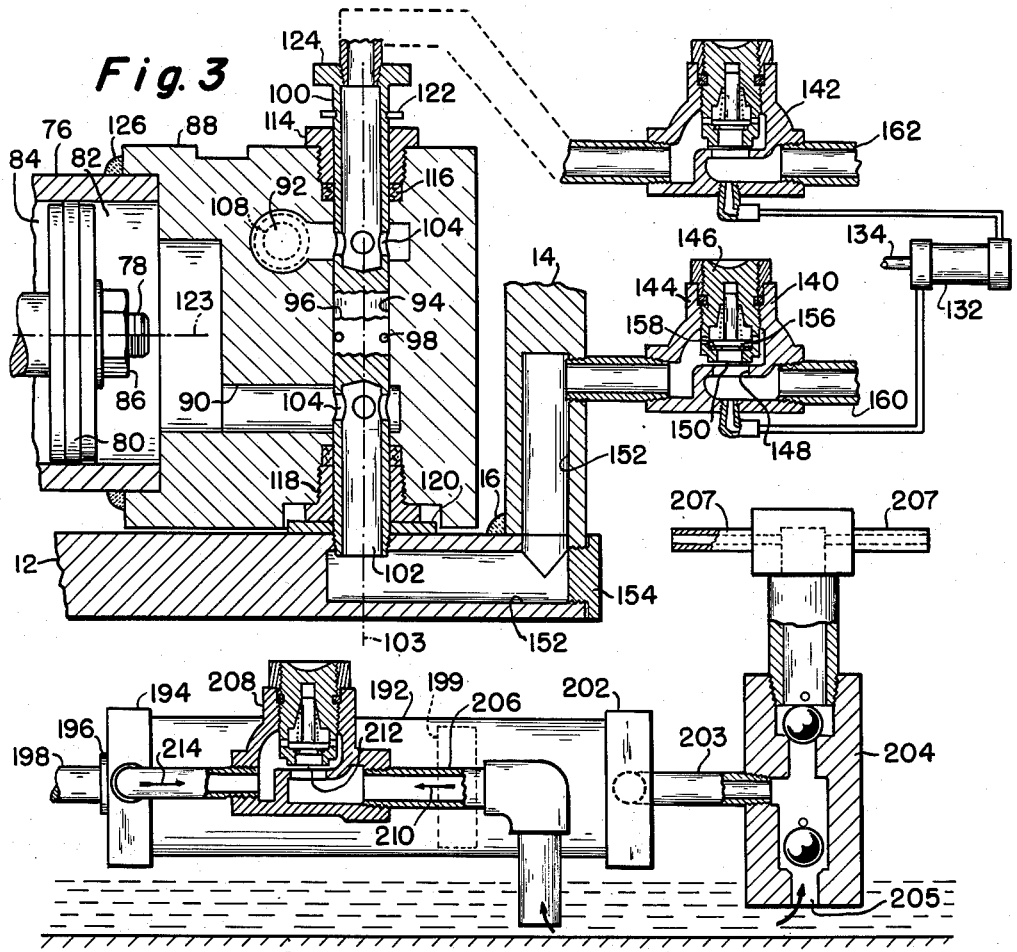
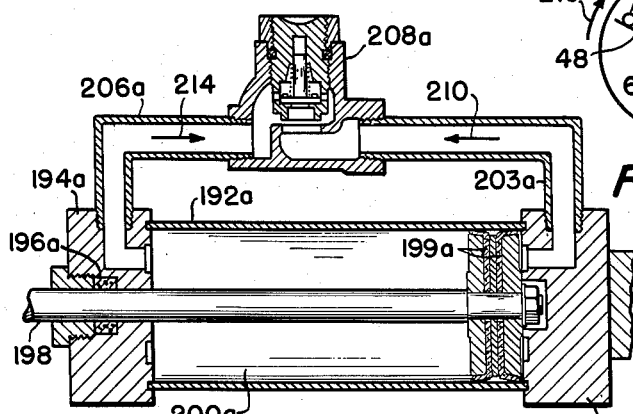
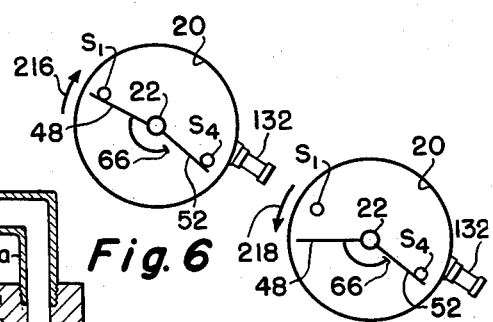
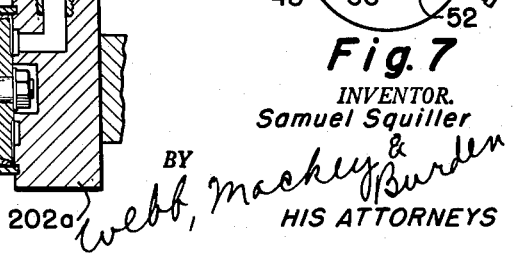

United States Patent Office 2,966,813
Patented Jan. 3, 1961

2,966,813

ROTARY INDEXING TABLE

Samuel Squiller, Mount Lebanon Township, Allegheny County, Pa. (1719 Holly Lane, Pittsburgh 16, Pa.)

Filed Feb. 12, 1957, Ser. No. 639,786

14 Claims. (Cl. 74—821)

The present invention relates to a rotary indexing table which is power operated so as to move a fractional part of a revolution at a time, more specifically, an exact submultiple of a revolution in successive steps. This application is a continuation-in-part of my copending application, Serial No. 536,942, filed September 27, 1955, and now U.S. Patent No. 2,833,164.

In the usual form, a rotary indexing table is circular in construction and is arranged with a series of machine stations about a portion of the periphery thereof. There are usually one or two loading stations about the remainder of the periphery plus an ejector station adjacent but posterior to the loading stations and in the interval forwardly from the loading stations to the ejector station there are provided various pieces of processing machinery for operating on parts or workpieces carried by the table. Such workpieces may be castings or second operation parts and are supported on the principal outside surface of the table by means of power operated chucks or other suitable fixtures made fast to the table. During each successive fractional part of a revolution, the individual workpieces are advanced from one station to another, examples of such stations being a drilling station occupied by drilling machinery, a milling station occupied by a milling machine, and a chamfering station having a chamfering tool provided to operate on the workpieces.

It is essential during each fractional part of a revolution of the table that each workpiece thereon move rapidly from a stationary position opposite one station and then be positively brought to a halt at an accurately predetermined indexing point opposite the next station. In the past, indexing machines have employed pneumatic dashpots or semi-elastic stops with which to cushion and stop the table thereof at the end of each fractional part of a revolution, but the compressible medium therein has the difficulty that it causes the table to bounce back from the point of indexed stop and tend to oscillate. Various other impositive stop devices have been tried in the past, along with the foregoing, but they have all generally met with the bouncing difficulty or else the difficulty of permitting overtravel of the table at the next stop, more commonly called over-indexing.

The present improved rotary indexing table overcomes the foregoing disadvantages and difficulties by means of having a hydraulically controlled cushioning device to bring the moving table to a positive inelastic stop. Generally, this cushioning is produced in a device physically separate from the system of parts constituting the actuation mechanism for this table but the device very effectively cooperates therewith to eliminate bounce or elasticity from the system. Further, the power actuation means, which in the present case is pneumatic, is employed so as to act at a point of maximum leverage and torque on the table to set it in motion with the maximum utility of effort and, likewise, the controlled hydraulic cushion device for stopping the table is connected at a similar but separate point so as to provide maximum leverage for efficiently stopping the table without shock or bounce. This device may utilize a closed hydraulic system in its function whereby it is entirely effective as will be noted, but according to the one preferred embodiment herein disclosed, an open type hydraulic system renders it capable of performing the dual function of cushioning and force feeding lubricating oil. The present improved table also has a power actuated latch for positively latching the same at each station against rotary movement in two directions so as to positively prevent over-indexing or any reversal of motion which might result in under-indexing. Finally, though not necessary in all cases, a one-way pawl or ratchet is provided as an added measure for preventing reversal of motion of the table.

Further features, objects, and advantages will be specifically pointed out or become apparent when for a better understanding of the invention reference is made to the following description taken in conjunction with the accompanying drawings, in which in general:

Figure 1 is a sectional view in side elevation of the present rotary indexing table;

Figure 2 is a partially diagrammatic plan view taken along the sectional lines II—II of Figure 1;

Figure 3 is a sectional view taken along the lines III—III of Figure 2;

Figure 4 is an elevational view partly in section taken along the lines IV—IV of Figure 2;

Figure 5 shows a modified form of the device of Figure 4; and

Figures 6 and 7 are diagrammatic sequential views showing certain steps of operation of the present table.

In particular, Figures 1–4 show an indexing table structure 10 having a thick generally square metal base 12, which is horizontally disposed and carries an upstanding cylinder 14 which is a thick-walled casting either attached thereto by welding shown at 16 or it may be formed integral with the base 12 as a one-piece casting.

Each of the four corners of the square base 12 is rounded at the outside edge and has a hold-down bolt opening 18 spaced inwardly from the edge for use in firmly securing the base to a suitable supporting surface, not shown. The table structure 10 is a hollow fluid tight enclosure providing a wet sump type of machinery compartment 20 and containing an upstanding post 22 in the center thereof which is provided with a circular attaching flange 24 suitably bolted to the base 12 as shown or it may be cast integral therewith.

The upstanding post 22 has a vertically disposed central axis 26 and receives at its upper end the hub of a flat, thick table or head 28 of metal which is horizontally disposed to form the upper side of the machinery compartment 20 and closes off the same. The hub of the table 28 has a counterbore receiving a thrust bearing 30 and at its periphery the table 28 rests upon the flat upper edge of the short cylinder 14. The upper edge of the cylinder 14 which confronts and supports the underside of the table 28 has a transverse bearing surface formed with a pair of spaced-apart annular grooves 32 which hold oil, this oil being initially transferred to the underside of the table as it wipes upon one end of a series of felt oiling wicks 34 which dip into or are fed from the wet sump reservoir in the compartment 20. This method of lubrication is used when the indexing table is operating in horizontal position. A sight gauge 36, which seals the only wall opening formed in the cylinder 12 below the sump level mark so as to retain the fluid-tight integrity thereof, enables a proper oil level to be visually noted and maintained at all times.

A hexagonal adjustable hold-down bolt 40 is threaded into a tapped bore formed in the upper end of the post 22 and engages the thrust bearing 30 under predetermined preload so as to clamp the table 28 firmly against the top of the cylinder 14 in a manner whereby the lubricated edge of the latter and the bearing 30 cooperate to permit rotary movement of the table 28.

A hub cover 41 is detachably mounted to the top of the table 28 above the hexagonal hold-down bolt 40 on the outer surface of the table 28. This indexing table may be built with any desired number of stations. Illustrated in Figure 2, is a six station table, on which there are provided six chucks or fixtures 42 that carry individual workpieces 43 each of which is radially outwardly directed so as to be accessible to machinery, not shown, which is disposed about the periphery of the table 28 and which operates upon or otherwise machines or forms the workpieces 43.

On its underside, the table 28 carries a plurality of equally spaced depending studs S corresponding in number to the six chucks 42 and having attaching flanges 44 bolted directly to the table 28 to conform to a circular path.

A first swinging arm 48 in the compartment 20 has a hub 50 at the inner end thereof which receives the stationary post 22 and is swingingly mounted thereto by means of an antifriction radial bearing, not shown. The swinging arm 48 is the driving arm for the table 28, and drives the latter through engagement with the ring of studs S. A second swinging arm 52 forms a control or drag arm in the compartment 20 and has a hub 54 welded at 55 to the inner end thereof which contains a set of radial bearings, not shown, received on the post 22 at a level above the driving arm hub 50. The swinging arm 48 and hub 50 and also the swinging arm 52 and hub 54 may each be one-piece castings. The upper and lower hubs 54, 50 have a bolted-down retainer 56 which clamps them against the attaching flange 24 in a manner whereby they may turn on their bearings independently of one another about the post 22 but are firmly held against axial movement.

At its midportion between the inner and outer ends, the driving arm 48 carries a stationary pivot 58 on which a pawl 60 is pivotally mounted to oscillate between the solid line position shown in Figure 2 and a dotted line position 60a. A first coil return spring 62 acts in tension between a stop on the arm 48 and one end of the pawl 60 to urge the same into the solid line position of Figure 2 and a second coil return spring 64 acts in compression between the stop and the opposite end of the pawl 60 and serves the same purpose as double assurance against spring breakage. In the event of failure of either spring, the other spring remains effective to continue the return movement of the pawl 60. In the solid line position of Figure 2, the pawl 60 engages with one of the ring of depending studs carried by the table 28, which for convenience are identified by the specific reference numerals $S_1$, $S_2$, $S_3$, $S_4$, $S_5$, and $S_6$ in Figure 2.

Clockwise motion of advance of the driving arm 48 causes the pawl 60 and the stud engaged therewith, for instance the stud $S_1$, to move the table 28 clockwise in unison therewith. Retractive movement of the arm 48 in a counterclockwise direction causes the pawl 60 to separate from the stud $S_1$ and wipe against the side of the next successive stud $S_6$ which deflects the side of the pawl to oscillate the same into the dotted line position 60a in which it will initially clear the stud $S_6$ and then drop behind the same under return spring pressure to engage the latter for another successive driving movement.

The drag arm 52 carries a similar pawl 72 which is engageable by the ring of studs carried on the underside of the moving table to cause the drag arm 52 to move conjointly therewith toward the latter part of each successive turn of the table. Clockwise motion on the pawl 72 into the inactive position shown by the dotted lines 72a in Figure 2 is accomplished by a means more fully hereinafter set forth and results in the pawl 72 being clear of and out of the path of travel of the ring of studs, for instance, the stud $S_4$, with the result that the arm 52 is retracted independently of the table 28.

The arms 48 and 52 are interconnected for conjoint movement in a counterclockwise direction by means of a lost motion connection 66 which includes a lug joined to the hub 54 of the drag arm and engaged by means of a threadably adjusted stop 68 which is locked to the arm 48 as by means of a lock nut or other suitable retainer carried by the stop.

A nonback-up pawl 73 (designated 73a in its withdrawn position) is carried by the stationary base 12 and is spring urged into a position in which it prevents reverse movement of the ring of studs, for instance, the stud $S_6$, and the table 28 during retractive movement of the arm 48.

The arm 48 carries a rigid depending pivot 74 at its outer end which describes an arcuate path of motion closely spaced with respect to the cylinder 14. A pneumatic driving cylinder 76 for driving the arm 48 has a piston rod 78 provided with an eye which is connected to and receives the pivot 74. The piston rod 78, Figure 3, passes inwardly from its eye into the cylinder 76 and carries a piston 80 at the inner end which divides the cylinder 76 into an inner working chamber 82 and an outer working chamber 84 which when selectively pressurized force the piston and piston rod 78 to slide inside the cylinder 76. A retainer nut 86 screwed onto the rod 78 holds the rod 78 and piston 80 together. The cylinder 76 has a cast closure member 88 at the inner end thereof which is provided with a vertically directed eye 94 and a pair of upper and lower passages 92 and 90 which are transverse to and intersect the eye 94. The eye 94 receives a smooth surfaced upstanding stud 96 having a groove about the girth of the midportion thereof which receives O-ring seal 98 which seals apart the two passages 90 and 92. The stud 96 has a pair of hollow tubular opposite end portions 100 and 102 which extend in opposite vertical directions from the midportion thereof along a central axis 103. Adjacent the juncture between the solid midportion and each of the ends, the stud 96 has a series of side openings 104 which communicate with the interiors of the upper and lower portions 100 and 102 and which register with the respective passages 90 and 92 in the closure member 88.

At the end opposite to the inner closure member 88, the cylinder 76 has an outer closure member 106 which slidingly receives the piston rod 78, being sealed fluid tight to the latter and communicating directly with the outer working chamber 84 within the cylinder 76. The upper passage 92, Figure 3, in the closure member 88 is connected by means of the outer closure member 106 to the outer working chamber 84 through a fitting 108, a rigid pipe 110, and another fitting 112. At the upper end of the eye 94, the closure member 88 receives a threaded, bronze bushing bearing 114 which turns on the stationary stud 96 as a center, and which clamps a deformable seal 116 in fluid tight engagement against the stud 96. The lower end of the eye 94 threadably receives a similarly sealed bushing bearing 118 which rests upon a thrust washer 120 carried by the base 12. The lower end portion 102 of the stud 96 is threaded into a tapped opening in the base 12. A snap ring retainer 122 occupies a groove on the stud portion 100 and at its upper extremity the stud portion has a hexagonal-shaped enlarged portion 124 for receiving a tool to tighten the threaded lower portion 102 of the stud 96 into the vase 12. The resulting cylinder assembly including the cylinder 76 and the end closure members 106, 88, which are bolted or welded fluid tight thereto at 126, is swingably mounted for oscillatory movement in a horizontal plane about the stud axis 103 as a center.

The base 12 carries a rigid upstanding pivot 127, Figure 2, which pivotally mounts the lower end of an oscillatable latch 128 having a semi-circular notch 130 in the inner side of the upper swinging end thereof. A pneumatically operated power cylinder 132 is connected to drive the pivoted latch 128 into a pair of opposite positions by means of a piston rod 134 which is pivotally connected to the upper swinging end of the latch. The power cylinder 132 forces the latch 128 to swing from the solid line unlatched position of Figure 2 into the dotted line latching position shown by the dotted lines 128a in which the lug forming outer end of the latch 128 engages the pawl 72 to move the latter into its inactive position shown by the dotted lines 72a. Additionally, the notch 130 receives and retains the adjacent stud $S_4$ simultaneously being released by the pawl 72. A stop 136 is bolted to the base 12 adjacent the pivot 127 and is engaged by the drag arm 52 in the extreme clockwise position of the latter into which it is driven by the studs on the table 28, for instance, by means of the stud $S_4$ in the position of Figure 2. Operation of the motor 132 to drive the latch 128 to the dotted line position 128a of Figure 2 has a twofold effect in that the opposite shoulders on the latch defining the notch 130 hold the stud $S_4$ and the table 28 against movement in both rotational directions. The latch 128 also causes the pawl 72 to disengage from the stud $S_4$ and occupy an inactive position in which the arm 52 may appropriately retract in a counterclockwise direction beneath the stud $S_4$.

The power cylinders 76 and 132 have a common control valve 138 which is connected thereto through a pair of flow-check valves 140 and 142. The flow-check valve 140 has a pair of split branches which are connected to the inner working chamber 82 of the cylinder 76 and to the front of the latch control cylinder 132 so as to cause the same to retract at the time at which the cylinder 76 extends itself. The flow-check valve 142 has a pair of split branches which are connected to the outer working chamber 84 of the cylinder 76 and to the rear of the cylinder 132 for extending the latter and advancing the latch 128 at the time at which the cylinder 76 is retracted.

The flow-check valves 140, 142 are identical with one another and in the interests of brevity only the flow-check valve 140 is particularly described hereafter. The flow-check valve 140 includes a valve body 144 in which a center member 146 is threadably, adjustably received. The lower end of the center member 146 adjustably covers and restricts an opening 148 formed in the valve body and defining an adjustable annular gap 150 therewith. The inner working chamber 82 in the cylinder 76 is connected through the hollow interior of the lower stud portion 102 by means of a pair of passages 152 which are drilled to intersect with one another and which are arranged in the base 12 with a plug 154 provided at their point of intersection. The passages 152 are connected to the posterior end of the flow-check valve 140, and also the branch line from the power cylinder 132 is similarly connected to the valve 140. When a stream of exhausting air flows from the working chamber 82 through the flow-check valve 140, it passes through the adjustably restricted gap 150 in the valve 140 which thereby controls the speed and rate at which the cylinder 76 operates. Another stream of exhausting air is simultaneously flowing from cylinder 132 and enters in opposite end of valve 140 which is not restricted. The center member 146 in the flow-check valve 140 is hollow and carries a poppet type, spring loaded check-valve element 156 which seats upon an O-ring seal 158 carried in the inner part of the center member 146. When fluid passes in the direction from the common control valve 138 into the working chamber 82 of the cylinder 76 and into the front of the cylinder 132, it causes the check-valve element 156 to unseat upwardly and bypass the adjustable gap 150 so as to provide free flow in entering the respective cylinders. The companion flow-check valve 142 operates similarly to provide for the free unchecked flow of fluid into the cylinders 76 and 132 and for the restriction-controlled escape of fluid exhausted therefrom.

The control valve 138 is a three-spool type solenoid valve which is connected at one end through a conduit 160 to the flow-check valve 140 and is connected at the opposite end to the companion flow-check valve 142 through a conduit 162. The valve 138 has a pair of opposite operating positions, 138a and 138b, which it assumes from the solid line transition position shown in Figure 2. In the operating position shown by the dotted lines 138a shown to the left in Figure 2, the valve 138 has a spool which closes off a right-hand vent V, and also the valve 138 connects the conduit 162 directly to a pneumatic pressure source 164, simultaneously venting the conduit 160 through a left-hand vent V. In the opposite position shown by the dotted lines 138b to the right, the valve 138 connects the conduit 160 and the pneumatic source 164, and vents the conduit 162 through the right-hand vent V. The three spool element in the valve 138 may have a ball detent device, not shown, to hold the same positively in each of its two opposite operating positions, and carries an armature 166 at each of its opposite ends. A solenoid coil 168 is provided for electromagnetically controlling each of the armatures 166 so as to selectively shift the valve 138 into each of its operating positions, depending upon which coil 168 is energized.

Magnetization of the coils 168 is accomplished through a source of electric power 170 which may be energized at 110 volts A.C. and is connected thereto through a suitable double pole switch 172. A manually controlled push button switch 174 between the switch 172 and one of the coils 168 operates the latter whereas the other coil 168 is included in circuit with a pair of conductors 176 and 178 which are connected through the operation of a reversing microswitch 180. The microswitch 180 has an actuating finger 182 protruding inwardly through a narrow slot located in the wall of the cylinder 14 above the liquid level of the sump and is engaged by the arm 48 to effectively close the microswitch 180 in the extreme clockwise driving direction of the arm 48 so as to reverse the latter. Thus, closure of the microswitch 180 causes the valve 138 to be electromagnetically shifted into the operating position 138b. Thereupon, the cylinder 76 is caused to withdraw itself and retract the arm 48 simultaneously with the extension of the cylinder 132 which forces the latch 128 into latched position. The driving arm 48 is caused to retract counterclockwise and, toward the end of its retractive travel, for instance, three-quarters of the way through the retractive travel, the lost motion connection 66 engages and establishes a connection between the arms 48 and 52 with the result that they move in unison together through the last quarter of the retractive travel of the arm 48.

A dead center switch 184 similar to the microswitch 180 may be provided with an actuating finger 185 likewise protruding within the machinery compartment 20 in a position exactly engaged by the arm 52 at the end of its stroke or, as shown, in a position just opposite to a stud, for instance, the stud $S_5$, so as to be in the path of and be engaged directly by the studs on the table 28. The dead center switch 184 has connections 187 leading to and transmitting a signal to appropriate machinery, not shown, disposed about the table 28 for preparing the machines for automatic operation at a time only when the table 28 is properly indexed and at rest. The non-back-up pawl 73 prevents any retrograde travel of the table which might be a tendency during reversal and initial movement of the arm 48 or 52 or both as they retract. The latch 128 positively holds the table 28 in a latched properly indexed position in which the dead center switch 184 is actuated. Closure of the manually controlled switch 174 causes the control valve 138 to be electromagnetically shifted into the dotted line position shown by the dotted lines 138a for driving the table 28 forwardly, but without attendant motion on a part of the drag arm 52 except during the last quarter of each stroke of travel of the driving arm 48 and the table 28.

The drag arm 52 describes an arcuate path of swing closely spaced to the cylinder 14 and at its swinging outer end it carries a rigid depending pivot 188. The base 12 carries an upstanding anchoring pivot 190 which swingably mounts the fixed end of a hydraulic pump cylinder device 192 which is arranged with an internal working chamber adapted to be charged with the incompressible liquid from the reservoir, preferably lubricating oil. The cylinder device 192 is doubleacting and has an end closure member 194 at the free end thereof carrying a seal 196 through which a piston rod 198 slides. At the outer end the piston rod 198 has the eye thereof connected to the pivot 188 and at the inner end the piston rod 198 is threaded and carries a retaining nut and a solid piston 199 which reciprocally slides in the working chamber of the device 192. The piston divides this working chamber into one compression chamber or section 200 adjacent the closure member 194 and into a separate opposite compression chamber 201 closed by another closure member 202 adjacent the pivot 190. A pipe 203 forms part of a connection fitting 204 leading to the compression chamber 201 through the member 202 and containing lower and upper ball check valves controlling, respectively, a submerged pump inlet 205 and a spray head formed by oppositely extending, forced feed oil pipes 207. The chamber 201 thus continuously replenishes itself with oil and, as it collapses, the oil is forced through the headpiece pipes 207 in jets to splash lubricate the machinery in the compartment 20.

The end closure member 194 carries a conduit 206 which includes a flow-check valve 208 and which has the inner end communicating with the compression chamber 200 and the outer end submerged in the reservoir oil. The flow-check valve 208 used with the hydraulic cylinder device 192 is similar to the flow-check valve 140 for the pneumatic system previously described and it is operated in the same fashion except for the fact that it handles hydraulic liquid and not air or other compressed gas. The flow-check valve 208 unseats upwardly to permit free flow of the hydraulic fluid therethrough in the direction of the arrow 210, Figure 4. However, the valve 208 has a restrictive gap 212 which causes resistance to flow in the direction of the arrow 214. Movement of the piston rod 198 to the left, as viewed in Figure 4, causes hydraulic fluid trapped between the piston 199 and the end closure member 194 to meet with resistance in transferring through the bypass 206 to return to the reservoir and it, therefore, raises the pressure ahead of the restriction 212. The drag produced by the drag arm 52 tends to be substantial and the table 28 starts to drastically reduce in speed slightly short of completing each of its strokes of advancing motion. The restriction 212 is adjusted according to weight or load on table 28 in order to obtain proper cushioned stop. At the end point of advancing motion of the arm at which it engages the reversing microswitch 180, the drag arm 52 is at or close to engagement with the limit stop 136, Figure 2.

The embodiment of Figure 5 provides for the oil to course through a closed circuit which may be incorporated according to a device 192a in case a dry sump type operation is desired. That is, the device 192a is charged with a permanent body of recirculated hydraulic fluid which merely shuttles or transfers from one end to the other and back. In this case, the end closure member 194a and the opposite end closure member 202a are interconnected by their respective pipes 206a and 203a which are consolidated in a closed path by means of the interposed flow-check valve 208a. The piston rod 198 is threaded and carries a retainer nut and a pair of washers which clamp two leather or neoprene cups 199a between them, these cups being optionally solid like the previous piston 199 with O-rings but in any case forming the piston in the working chamber of the device 192a. The system is completely filled with oil which is prevented from escaping by means of the seal 196a and when this cup 199a moves to the right, as viewed in Figure 5, the flow-check valve 208a unseats upwardly to permit free flow of the hydraulic fluid as it transfers in the direction of the arrow 210 to the opposite end of the device 192a. Movement of the piston rod 198 to the left, as viewed in Figure 5, causes hydraulic fluid trapped between the cup 199a and the end closure member 194a to meet with resistance as it leaves the pipe 206a, and in going through the restriction in the seated valve 208a it causes the pressure to rise in the compression chamber 200a. This resistance to flow retards movement of the piston rod 198 and thus dissipates the energy due to the momentum of the drag arm 52 and table 28 of Figures 1 and 2.

A cycle of operation of the rotary indexing table through one fractional part of a revolution is best understood from the sequential Figures 2, 6, and 7.

Figure 2 shows the arms 48 and 52 approximately in the fully retracted position which they occupy with respect to the post 22 prior to an advancing stroke within the machinery compartment 20. From the position of Figure 2, the driving arm 48 initially advances in the direction of the arrow 216, Figure 6, so as to cause the studs $S_1$ and $S_4$ and the table to advance clockwise into a position whereby the latter stud engages the drag arm 52. At that point and also in the position of Figure 6, the lost motion connection 66 occupies its fully extended position. Further motion from that point by the driving arm 48 in the direction of the arrow 216, Figure 6, is accompanied by conjoint motion of the drag arm 52 due to the connection formed between the arms by means of the studs $S_1$ and $S_4$ which are rigid with the rotary table.

Figure 6 shows the arms 48 and 52 in their extreme counterclockwise position about the post 22, at which the lost motion connection 66 is fully extended, and at which the driving arm 48 contacts the reversing switch 180, Figure 2. The latching motor 132, Figure 7, causes the latch to engage the stud $S_4$ at the time at which the driving arm 48 reverses its direction of rotation.

Figure 7 shows the driving arm 48 after it has completed approximately three-quarters of its reverse motion in the direction of the arrow 218. At this point, the lost motion connection 66 fully closes and the drag arm 52 begins to move conjointly with the arm 48 and beneath the stud $S_4$ which is latched by the latching motor 132. The relation of the stud $S_4$ to the drag arm 52 immediately after it is cleared by the latter is shown in Figure 2, at which instant the latch occupies the dotted line position 128a.

As herein disclosed, the invention is shown embodied in a horizontally disposed index table 28 which is lubricated with felt wicks which are saturated with oil from the wet sump type of reservoir through suitable vertically extending passages. It is evident in the dry sump embodiment of Figure 5 that the rotary table and associated structure can be used to equal advantage in vertical position by loading the grooves 32 with grease at its outer periphery and keeping them packed with grease guns and the usual nipple fittings provided. The fact will be appreciated that the flow-check valve 208 or as modified at 208a is utilized to provide a controlled hydraulic cushion which materially drags on the drag arm 52 in one direction only of the piston rod 198 and that retractive movement of the piston rod 198 is accomplished against considerably lesser hydraulic resistance. Thus the pump work of the oil-forcing piston 199 as it moves to the right in Figure 4 is relatively low and the valve 208 unseats to enable the conduit 206 to draw freely. During similar movement of the modification of Figure 5, the leather cup 199a also tends to collapse as the valve 208a unseats.

Variations within the spirit and scope of the invention described are equally comprehended by the foregoing description.

I claim:

1. In indexing table structure arranged in assembly with control means to control the rotation of the table head between successive indexed positions and comprising reciprocating drive means included in and mounted to the arrangement of said control means, said drive means having means of connection establishing intermittent engagement thereof with the table head as the drive means reciprocates and further having driving mechanism connected thereto for operating said drive to intermittently engage and rotate said table head: the improvement comprising a drag arm mounted with said assembly to swing concentrically thereto and having an operative connection to drive means so as to restore the drag arm in one stroke of movement to a reset position and connectable by means of a connection to move in an opposite stroke of advancing movement with and when the table head has been rotated slightly short of each full indexing movement, a hydraulic device containing opposite working chamber sections and being operatively connected to said drag arm whereby on opposite strokes thereof one working chamber is being replenished with hydraulic fluid while another is collapsing, and fluid connections at opposite ends of said device, each including a check valve and effective to seat and divert the fluid flow in a forced path from the collapsing chamber for utilizing the escaping hydraulic fluid.

2. In indexing table structure for use in controlling a rotatable table head and having power means intermittently connectable to the table head and operative with a reciprocating motion to intermittently rotate the table head through the desired indexing movement, said structure being of a generally hollow construction which is closed on the sides and at the bottom and which is covered at the top by the rotatable table head to define a fully enclosed machinery compartment: the improvement in said construction comprising a pivoted drag arm therein having a connection to power means so as to be restored in one stroke of movement to a reset position and having an operative connection to move oppositely thereto on an advancing stroke with and when the table head has been rotated slightly short of one full indexing movement, and a liquid pumping device comprising working chamber structure and an oscillatable pump element therein and operatively connected between said drag arm and an anchoring point fixed in relationship thereto, said pump element dividing said chamber structure into opposite end sections which form compression chambers alternately operating on the advancing and resetting strokes of said drag arm, and separate means of connection to said compression chambers for directing one stream of pumped fluid during the resetting stroke through oil lubricating passages for splash lubricating the machinery in said compartment and another stream through a restricted passage to materially retard movement of the arm during the advancing stroke.

3. For use in a wet sump type of machine operation, rotated means, power means for causing rotation thereof and operating with a reciprocatory motion, said rotated means and said power means comprising mechanism requiring oil lubrication, and a double acting device connected by means of connections to said rotated and reciprocatory means to operate through both forward and reverse strokes of movement in response to operation of the means aforesaid and forming a combined lubricating pump and hydraulic damper comprising a cylinder, a slidably related piston therein, a connection at one end of the cylinder having a lubricating line outlet to tap and utilize pressure developed in the cylinder by which a forced feed of oil is supplied to said oil lubricant requiring mechanism during relative motion between the piston and cylinder on one stroke, a headpiece connected to said lubricating line outlet for directing the supply of oil to said mechanism as aforesaid, and a connection at the other end of the cylinder having a restricted outlet through which oil must be forced against resistance so as to dissipate substantial energy through escaping oil during the opposite stroke.

4. In a wet sump type of machine operation for use with rotated means and operating means therefor which reciprocates for causing rotation of the rotated means within said machine, said rotated and rotating means comprising mechanism requiring oil lubrication: the improvement comprising a double acting device connected by means of connections to said rotated and reciprocating means to operate through both forward and reverse strokes of movement in response to operation of said means and forming a combined lubricating pump and hydraulic damper, said device comprising a cylinder, a slidably related piston therein, a connection at one end of the cylinder having a lubricating line outlet for communicating lubricant oil to said means to which a forced feed of oil is supplied thereto during relative motion between the piston and the cylinder on one stroke, a headpiece connected to said lubricating line outlet for directing the supply of oil to lubricate the mechanism of said means aforesaid, a connection at the other end of the cylinder having a restricted outlet through which oil must be forced against resistance so as to dissipate substantial energy in escaping during the opposite stroke, and a reservoir for a common body of oil in which said connections are adapted to be submerged and communicating through the mouths of openings in said connections enabling the opposite ends of the cylinder to be replenished and to operate with one liquid for both functions.

5. In a wet sump including rotated means to be intermittently rotated under power, reciprocable power drive means having an operative connection to said rotated means and further having controls therefor to intermittently reciprocate same whereby the drive means is effective through said connection to intermittently rotate said rotated means, and a drag arm having operative connections to the two means aforesaid whereby the drag arm is rocked thereby through alternate advancing and resetting strokes: the improvement comprising a double acting pumping device including working chamber structure and an oscillatable pumping element therein, means for attaching said device to the drag arm to be positively driven thereby on both advancing and resetting strokes of the latter, and fluid connections which communciate with the opposite ends of said device and through which oil is alternately inducted to replenish the working chamber from opposite ends, one of said connections having a lubricating line outlet and another having a one-way restriction restricting the outlet flow therefrom, said pumping element dividing said structure into opposite compression chambers effective on opposite strokes for pumping liquid therefrom through said fluid connections to provide a forced oil feed to lubricate the aforesaid means and said drag arm during one stroke and to materially resist its opposite stroke.

6. In combination, a wet sump type of receptacle for movable member mechanism and being fluid tight for holding a free pool of oil to lubricate same, a double action pumping means operatively connected between said receptacle and one of said movable mechanism members, said movable mechanism including a rotated table head member, power means effective with a reciprocatory motion for interruptably rotating said table head member, and a drag member having an operative connection to the head member so as to be carried by movement of said table head member at least part way through each portion of its movement, said drag member further having an operative connection to reciprocatorily moving power means for being carried in the opposite direction to a reset position, said pumping means having working chamber structure and an oscillatable pumping element therein dividing same into opposite compression chambers, and means providing separate immersed suction connections between said pool of oil and the individual compression chambers in said pumping means, said last-named means including at least one connection effective to resist discharge of the escaping oil flow from one compression chamber, another of said connection means carrying a headpiece for facilitating the distribution of the oil flow from another compression chamber to effectively lubricate said mechanism.

7. The combination according to claim 6 wherein said one of said connection means includes two-way flow means controlling oil flow therein so as to be more resistive one way than another, the other of said connection means defining an oil stream discharge line and including one-way flow means limiting output of the discharge line to unidirectional flow.

8. An indexing table structure in combination with a lubricant spray headpiece for impinging fluid in a path within said structure, power and control means for intermittently indexing said table structure including a control arm therefor, and located within the path of said fluid impingement from said headpiece, said power and control means including a piston and cylinder device connected to said control arm, said power and control means further including reciprocating power delivery mechanism for applying power to intermittently operate said table structure through its indexing motions, and to operate said control arm both in a direction of movement corresponding to index position and in its other direction to a reset position, and means forming separate fluid connections between a reservoir of fluid and each end of said cylinder, said headpiece being supported by one of said connections at the end of the cylinder and communicating with the fluid inside that end of the cylinder, said piston dividing said cylinder into opposite compression chambers for individual work performing functions, at least one of which consisting of forcing the fluid as aforesaid for impingement purposes to and through said headpiece under pressure.

9. In indexing table structure including table-rotating drive means which operates with reciprocatory motion, means intermittently effective to connect the table drive means and the table head when said drive means is operated, and control means to reciprocate said drive means for intermittently rotating the table head whereby it indexes a fraction of a revolution at a time; the combination with said table head of a swinging drag arm having an operative connection to power means so as to restore the drag arm in one stroke of movement to a reset position and carrying a one-way connection engageable with means on said table head for making the drag arm take up limited conjoint movement on an opposite stroke with and when the table head has been rotated slightly short of each full indexing movement, a hydraulic device containing opposite working chamber sections and being operatively connected to said drag arm whereby on opposite strokes thereof one section is being replenished with hydraulic fluid while another is collapsing, fluid connections at opposite ends of said device to direct fluid flow in a forced path and comprising at least one check valve means for utilizing the escaping and entering hydraulic fluid, and means in said structure operative to latch said engageable means on said table head immediately upon completion of each full indexing movement.

10. In an indexing table structure, the combination according to claim 9 wherein said engageable means on the table head comprises at least one protruding pin carried thereby, so as to be accessible for engagement by the one-way connection and by said latch means, said one-way connection being engageable with means on said latch means when the latter latches said pin so as to cause the one-way connection to simultaneously disengage from said pin.

11. In indexing table structure arranged in assembly with control structure to control the rotation of the table head between successive indexed positions and comprising reciprocatory power delivery means included in and mounted to the arrangement of said control structure and connectable to rapidly rotate the table head through successive indexing movements: the improvement comprising a drag arm mounted with respect to said assembly to swing concentrically thereto and having a connection to the table head to move in one of two opposite strokes of motion with and when the table head has been rotated slightly short of each full indexing movement and connectable to said means to be restored during another stroke of motion to a reset position, means swingably mounted adjacent said drag arm to lock said table head immediately on completion of each fully indexed movement from further movement in either direction, a hydraulic device containing opposite working chamber sections and being operatively connected to said drag arm whereby on opposite strokes thereof one working chamber is being replenished with hydraulic fluid while another is collapsing, and means through which the replenishing fluid is introduced into said working chamber and effective to provide a restricted discharge outlet from one of the working chamber sections so as to resist its collapse and materially slow the drag arm in said one direction of rotation.

12. In indexing table structure arranged in assembly with control structure to control the rotation of the table head between successive indexed positions and comprising forward and reverse stroke, power delivery means included in and mounted to the arrangement of said control structure and connectable to rapidly rotate the table head through a full indexing movement with each forward stroke: the improvement comprising a drag arm mounted with respect to said assembly to swing concentrically thereto and connectable by means of one connection to the table head to move with and when the table head has been rotated slightly short of each full forward stroke of indexing movement and having another connection to said means to be restored in a reverse stroke of motion thereof to a reset position, a hydraulic device containing opposite working chamber sections and being operatively connected to said drag arm whereby on opposite strokes thereof one working chamber is being replenished with hydraulic fluid while another is collapsing, and a transfer conduit common to said chamber sections to transfer a confined body of liquid therebetween through a closed path of circulation and including means effective to restrict flow one way therein to materially resist the collapse of one of the chambers for slowing the drag arm one way.

13. In indexing table structure including intermittent-work performing means having reciprocatory motion whereby it applies power operable to rotate the table head and including an operative connection to the latter enabling the reciprocatory motion of the work performing means to be transmitted to intermittently rotate the table head between successive indexed positions, said structure being of a generally hollow construction which is closed on the sides and at the bottom and which is covered at the top by the rotatable table head to define a fully enclosed machinery compartment: the improvement in said construction including a mounted drag arm therein connectable by having a connection to said means to be restored in one stroke of movement to a reset position and having an operative connection to move oppositely thereto on an advancing stroke of, by, with, and when the table head has been rotated slightly short of one full indexing movement, and a liquid pumping device comprising working chamber structure and an oscillatable pump element therein and operatively connected between said movable drag arm and an anchoring point fixed in relationship thereto, said pump element dividing said chamber structure into opposite end sections at least one of which forms a compression chamber on the advancing strokes of the oscillating pump element, and means through which the opposite end sections of said chamber structure are charged with liquid and containing a restriction effective to restrict discharge flow from the compression chamber so that the pump element as it oscillates on the advancing stroke with the drag arm resists the drag arm motion to correspondingly slow the table head during final indexing movement.

14. Indexing table structure for use with intermittent-work performing means operable with reciprocatory motion for intermittently applying power to rotate the table head between successive indexed positions, said structure being of a generally hollow construction which is closed on the sides and at the bottom and which is covered at the top by the rotatable table head to define a fully enclosed machinery compartment, said construction including a pivoted drag arm therein having a connection to said means to be restored in one stroke of movement to a reset position and having an operative connection to move oppositely thereto on a stroke of advance of, by, with, and when the table head has been rotated slightly short of one full indexing movement, and a liquid pumping device comprising working chamber structure and an oscillatable pump element therein and operatively connected between said drag arm and an anchoring point fixed in relationship thereto, said pump element dividing said chamber structure into opposite end sections at least one of which forms a compression chamber on the advancing strokes of the oscillating pump element, and means defining a confined path through which a body of liquid transfers between the opposite ends of said device and adapted to freely transfer liquid in one direction and restricted in the opposite direction by means effective on the advancing stroke to impede discharge flow from the compression chamber to resist the drag arm motion and correspondingly slow the table head during final indexing movement.

References Cited in the file of this patent
UNITED STATES PATENTS

| | | |
|---|---|---|
| 763,051 | Elliott | June 21, 1904 |
| 1,262,979 | Putnam | Apr. 16, 1918 |
| 1,714,921 | Parrish et al. | May 28, 1929 |
| 2,323,352 | Pitts | July 6, 1943 |
| 2,399,317 | Bigelow | Apr. 30, 1946 |
| 2,492,049 | Krone et al. | Dec. 20, 1949 |
| 2,640,400 | Verderber | June 2, 1953 |
| 2,672,955 | Lucien | Mar. 23, 1954 |
| 2,833,164 | Squiller | May 6, 1958 |